(12) United States Patent
Hokugoh

(10) Patent No.: US 6,484,994 B2
(45) Date of Patent: Nov. 26, 2002

(54) SUPPORT DEVICE OF A DISPLAY

(75) Inventor: Kazuo Hokugoh, Kato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/815,691

(22) Filed: Mar. 23, 2001

(65) Prior Publication Data

US 2002/0053629 A1 May 9, 2002

(30) Foreign Application Priority Data

Nov. 8, 2000 (JP) .................................. 2000-339910

(51) Int. Cl.[7] .............................................. A47G 29/00
(52) U.S. Cl. ....................... 248/371; 248/919; 248/922; 361/681; 361/682
(58) Field of Search .............................. 248/917, 919, 248/920, 921, 922, 923, 399.1, 278.1, 371; 361/680, 681, 682, 683, 686

(56) References Cited

U.S. PATENT DOCUMENTS

| 5,168,423 | A | * | 12/1992 | Ohgami et al. | 361/394 |
| 5,947,440 | A | * | 9/1999 | Cho | 248/917 |
| 6,216,989 | B1 | * | 4/2001 | Shioya et al. | 248/122.1 |
| 6,231,021 | B1 | * | 5/2001 | Hong | 248/371 |
| 6,330,993 | B1 | * | 12/2001 | Cho | 248/371 |

* cited by examiner

Primary Examiner—Korie Chan
Assistant Examiner—Deborah M. Brann
(74) Attorney, Agent, or Firm—Greer, Burns & Crain, Ltd.

(57) ABSTRACT

A compact support device for supporting a display body stably is provided. The support device of a display for supporting a display body in a manner pivotable in the horizontal plane and in the vertical plane comprises a substrate, an upper cover attached thereto, a middle cover being partially sandwiched between the substrate and the upper cover so as to be pivotable in the horizontal plane, and a tilting unit being attached to the middle cover and having a pivoting arm being pivotable in the vertical plane and being attached to the display body.

2 Claims, 11 Drawing Sheets

PRIOR ART    80

SUPPORT DEVICE OF A DISPLAY

BACKGROUND OF THE INVENTION

1. Field of the Invention

The present invention relates to a support device of a display for supporting a display body in a manner pivotable in the horizontal plane and in the vertical plane. The present invention can be used for a support device (a stand device) of a thin type display such as a liquid crystal display or a plasma display.

2. Description of the Prior Art

FIG. 11 is a perspective view of a display device 80 using a conventional support device 82 viewed from the backside.

As shown in FIG. 11, the display device 80 comprises a display body 81 and the support device 82. The support device 82 includes a pedestal portion 91 having substantially a rectangular shape viewed from the bottom and a stand portion 92.

A swivel unit 93 having a circular shape viewed from the bottom is attached to the bottom of the pedestal portion 91. The swivel unit 93 supports the pedestal portion 91 in a manner pivotable in the horizontal plane. The swivel unit 93 is placed on a surface of a desk or an appropriate table. The bottom surfaces of feet 94 provided in the bottom surface of the pedestal portion 91 are floated with a little clearance toward the surface of the desk or the table, or have a light contact with the same.

The upper front surface of the stand portion 92 is provided with a tilting attachment portion 95, to which the backside of the display body 81 is attached in a manner pivotable in the vertical plane.

Therefore, when holding and turning the pedestal portion 91 or the display body 81 in the horizontal direction, they can swing by the swivel unit 93 with respect to the surface of the desk or the table.

In the above-mentioned conventional support device 82, the swivel unit 93 contacts the surface of the desk or the table so as to support the entire body of the display device 80. However, the swivel unit 93 has a circular shape, and its bottom area is substantially smaller than that of the pedestal portion 91, and the feet 94 are floating from the surface of the desk or the table. Therefore, there can be some rattle between the surface of the desk or the table and the pedestal portion 91, resulting in reducing stability to some extent.

In addition, if the surface of the desk or the table is uneven or slanting, the bottom surfaces of the feet 94, can contact the surface of the desk or the table, so that the movement of the swivel unit 93 pivoting in the horizontal plane cannot be performed smoothly.

SUMMARY OF THE INVENTION

An object of the present invention is to provide a compact support device of a display for supporting a display body stably. According to one aspect of the present invention, a device is a support device of a display for supporting the display body in a manner pivotable in the horizontal plane and in the vertical plane. The support device comprises a substrate, an upper cover attached thereto, a middle cover being partially sandwiched between the substrate and the upper cover so as to be pivotable in the horizontal plane, and a tilting unit being attached to the middle cover and having a pivoting arm being pivotable in the vertical plane and being attached to the display body.

Preferably, the middle cover includes a cylindrical portion, a top plate portion provided on the upper end surface thereof, a ring plate portion extending outward in the horizontal direction from a periphery of the lower end surface of the cylindrical portion and a protruding shaft portion projecting downward from the middle portion of the top plate portion, and the protruding shaft portion is inserted in a pivot support hole provided substantially in the middle portion of the substrate in pivotable manner, and the ring plate portion is sandwiched between the substrate and the upper cover in pivotable manner so that the vertical movement is restricted.

In addition, the tilting unit includes two supporting members attached to a boss portion provided in the middle cover with screws that are inserted from the bottom, and the pivoting arm includes two leg portions that are pivotable with respect to the two supporting members and a coupling portion that couples integrally the two leg portions at the upper end portions thereof, and the coupling portion is provided with a hole or a protrusion for mounting the display body.

DESCRIPTION OF THE PREFERRED EMBODIMENTS

Hereinafter, the present invention will be explained more in detail with reference to drawings.

Figure 1:
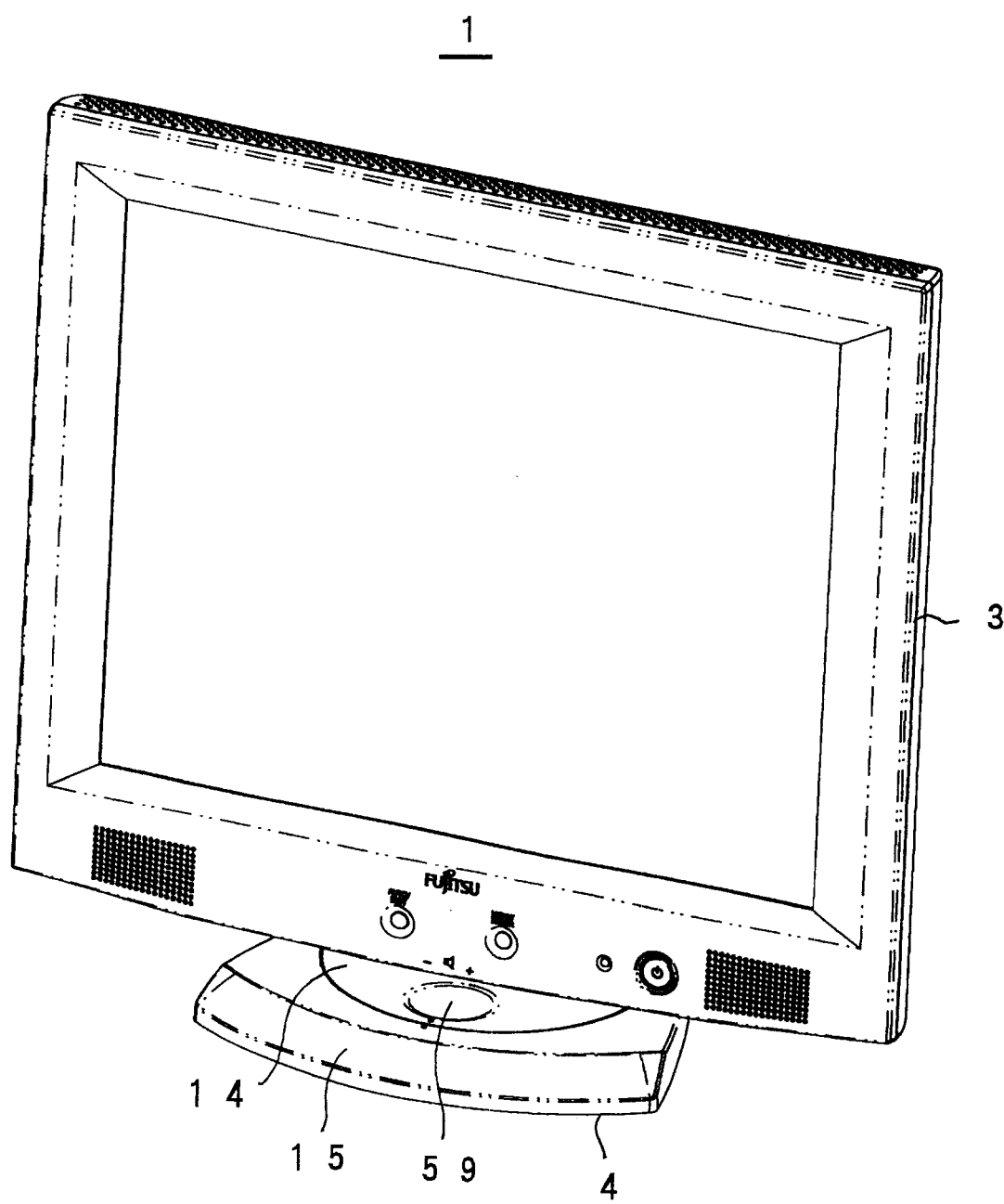
FIG. 1 is a perspective view of the display device using a support device of an embodiment of the present invention, viewed from the front.
Figure 2:
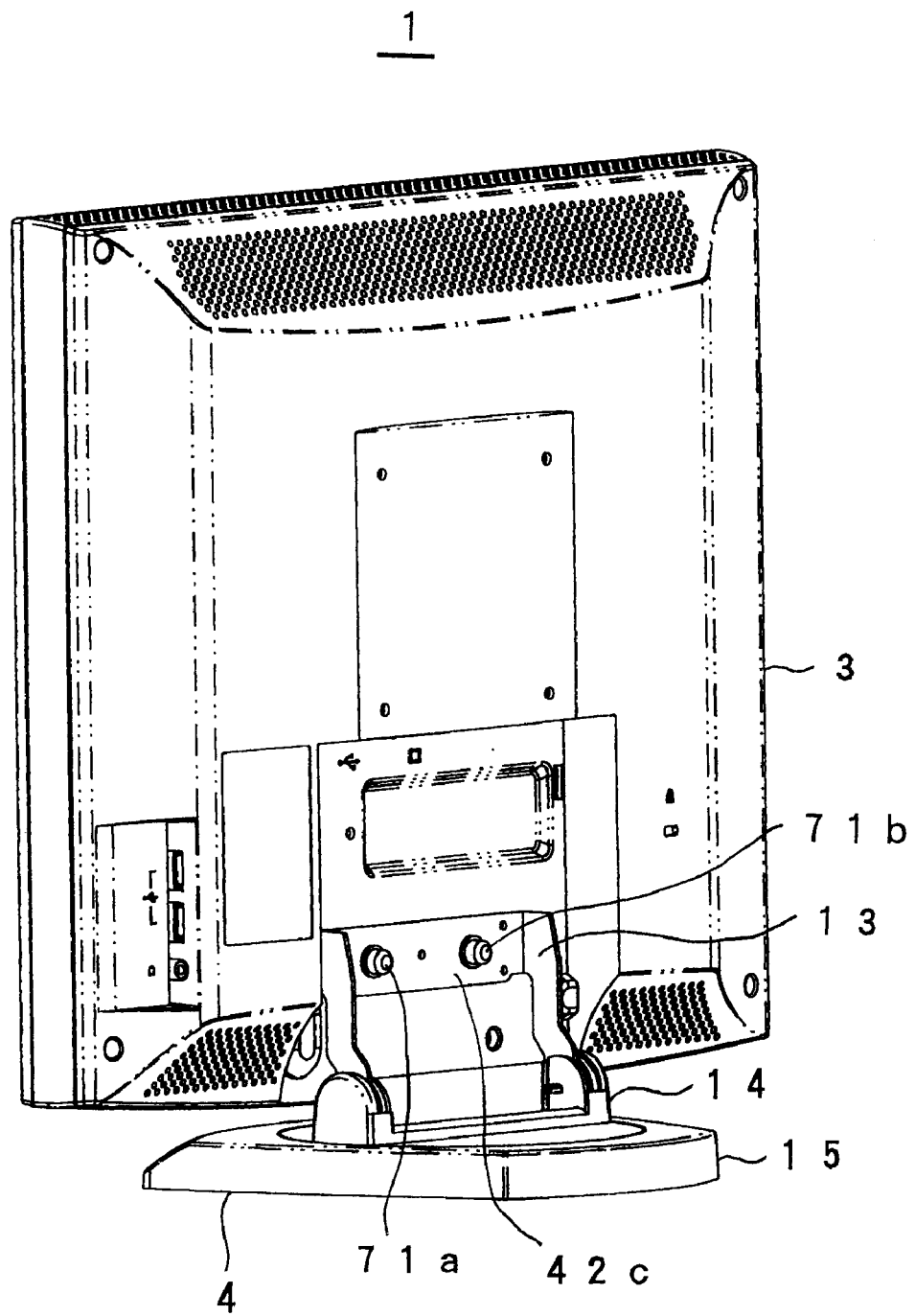
FIG. 2 is a perspective view of the display device viewed from the back.
Figure 3:
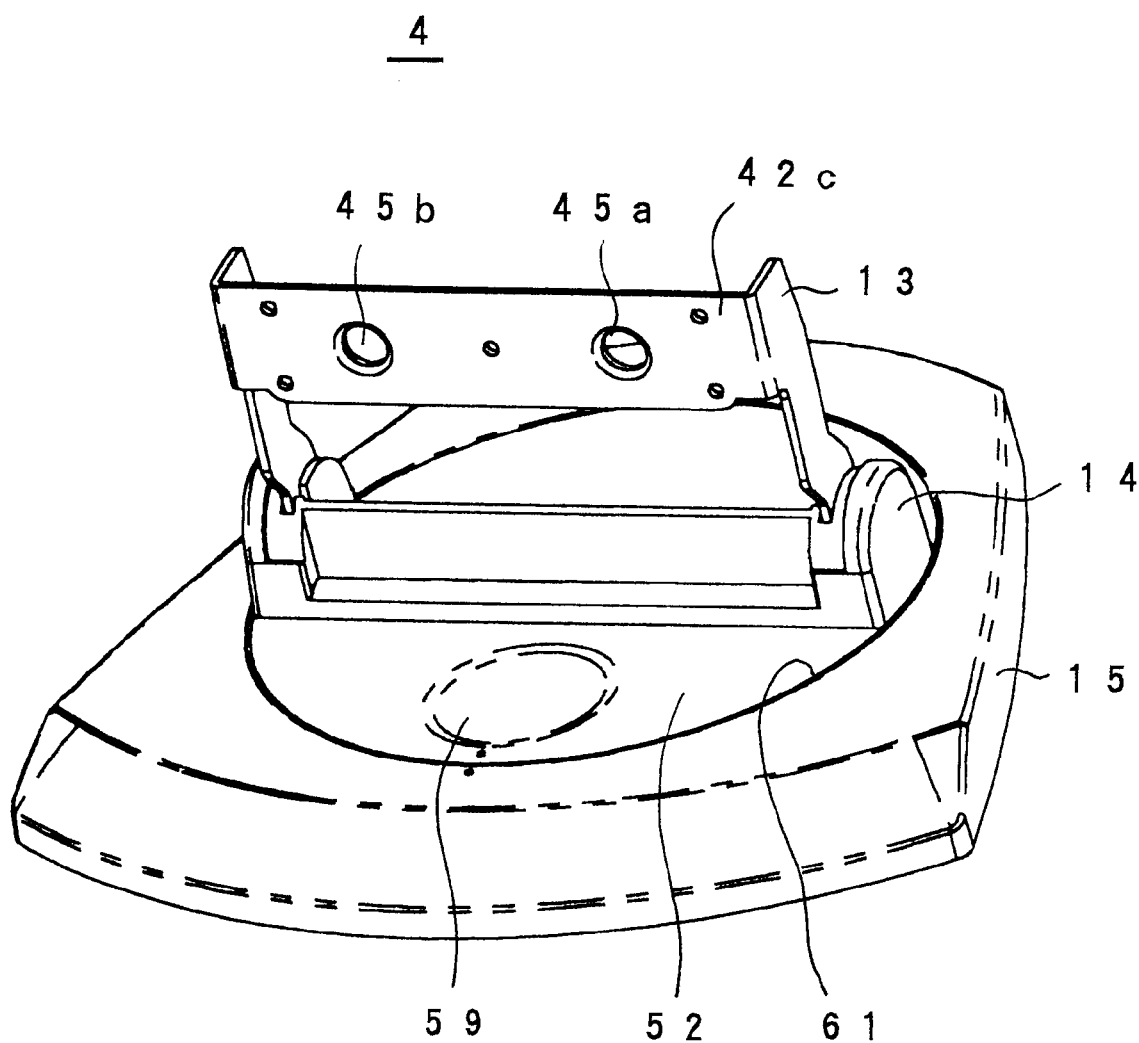
FIG. 3 is an enlarged perspective view of the support device.
Figure 4:
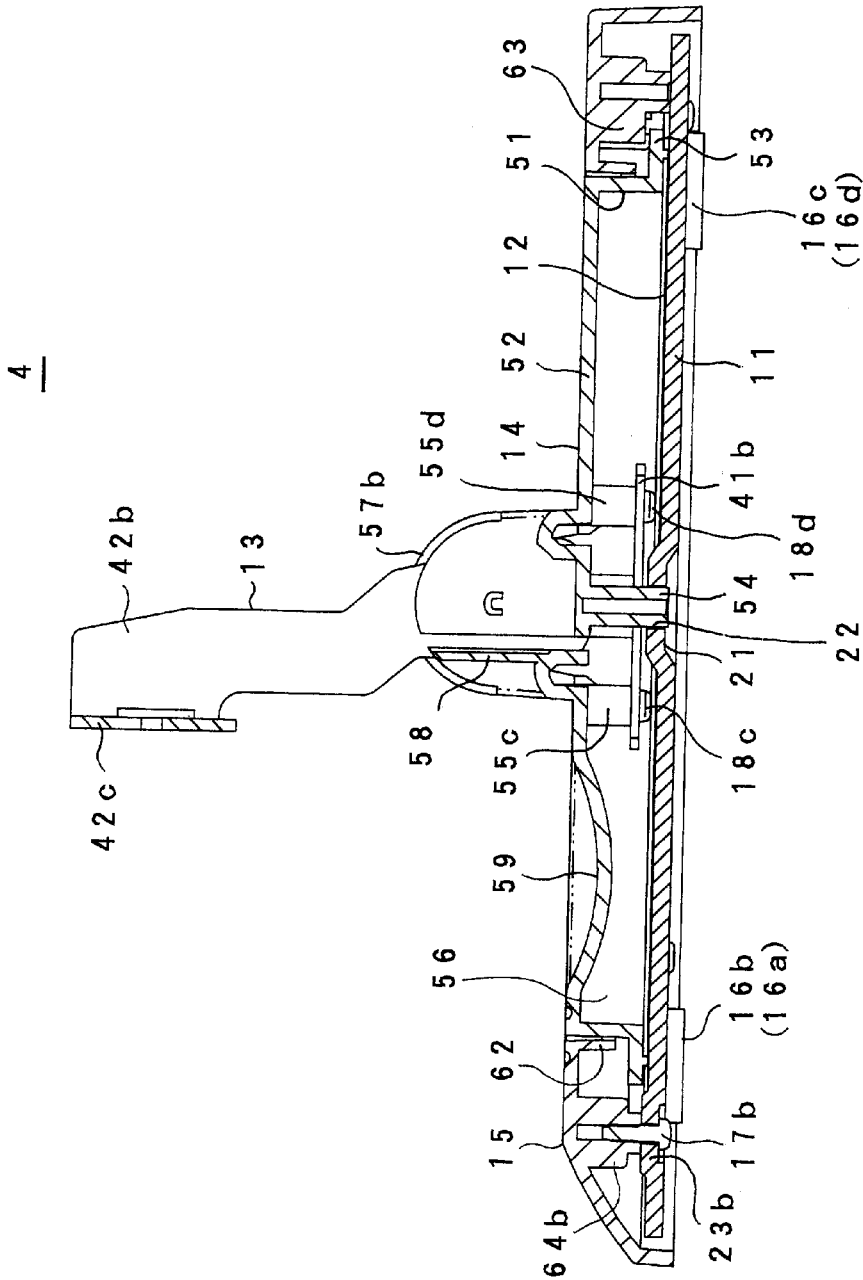
FIG. 4 is a cross section of the support device.
Figure 5:
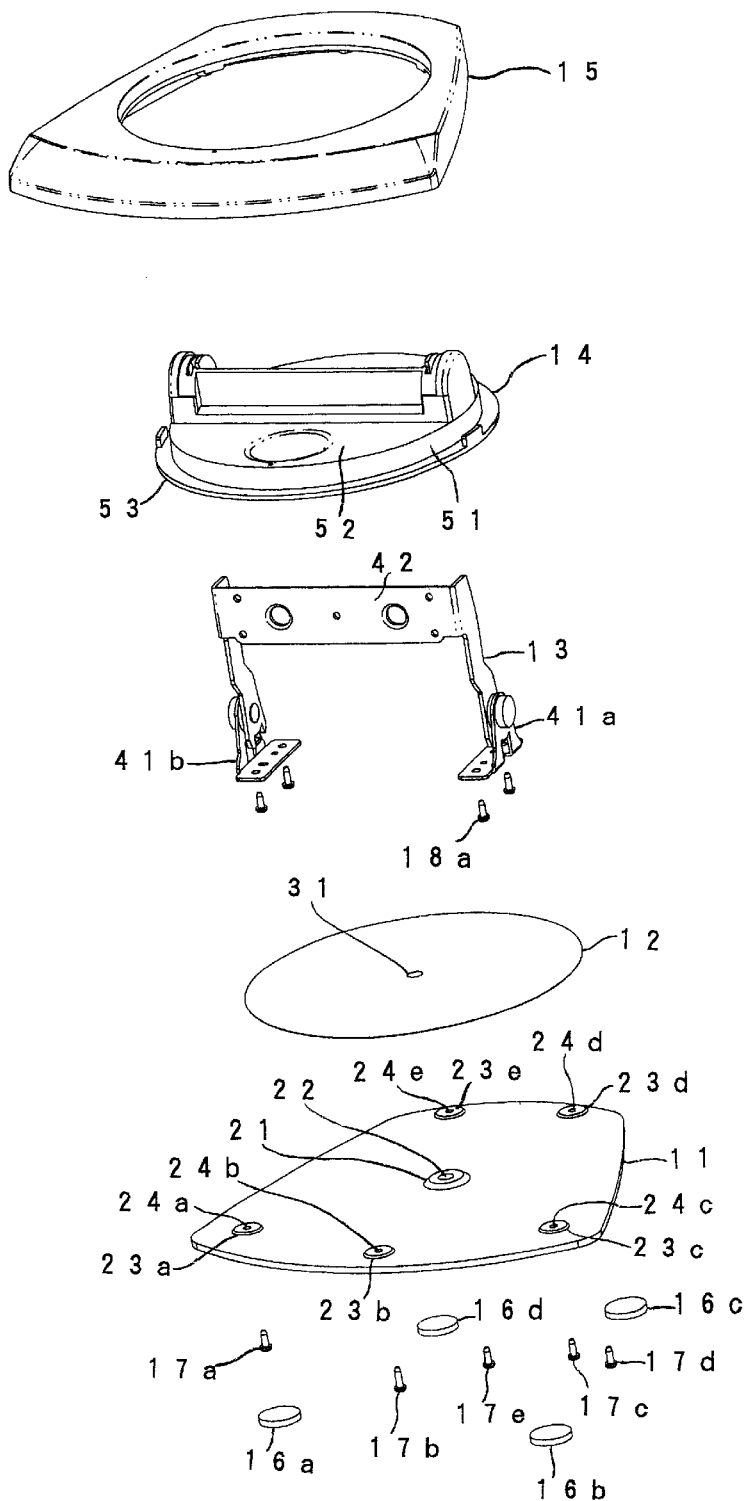
FIG. 5 is an exploded view of the support device viewed from the top.
Figure 6:
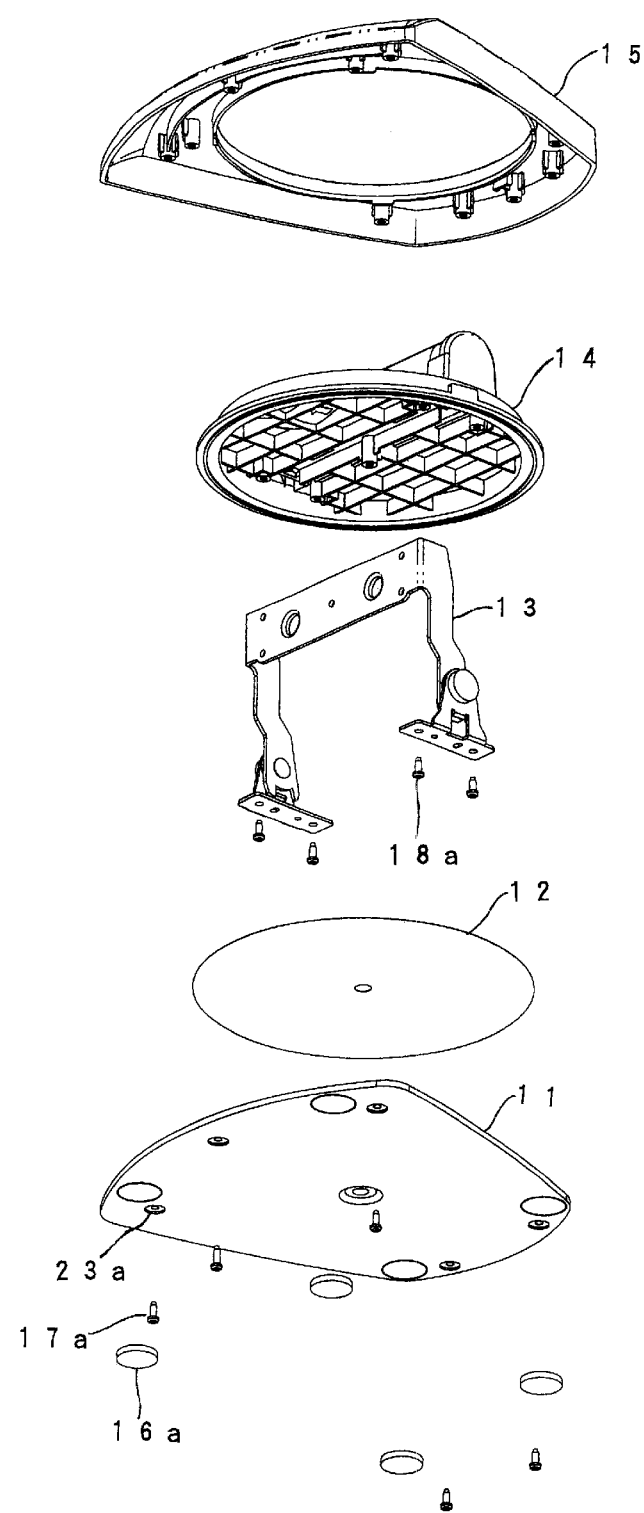
FIG. 6 is an exploded view of the support device viewed from the bottom.
Figure 7:
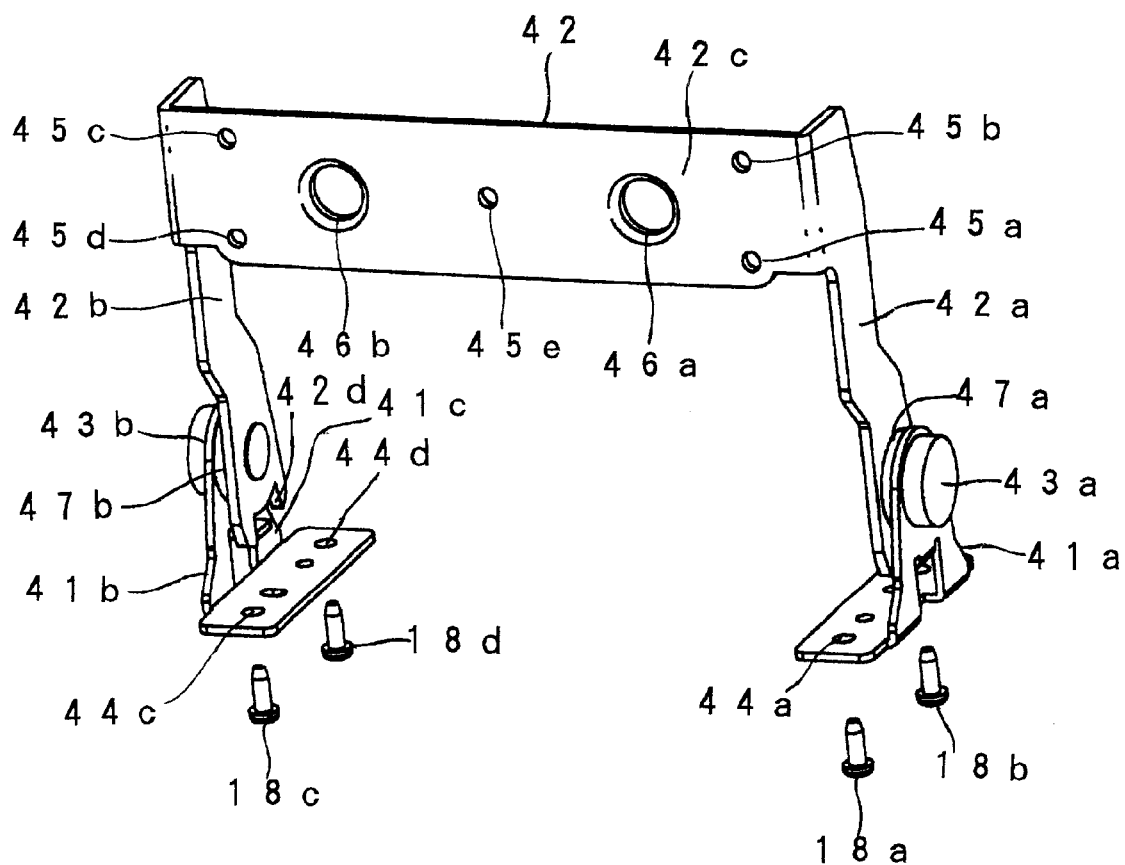
FIG. 7 is a perspective view of a tilting unit.
Figure 8:
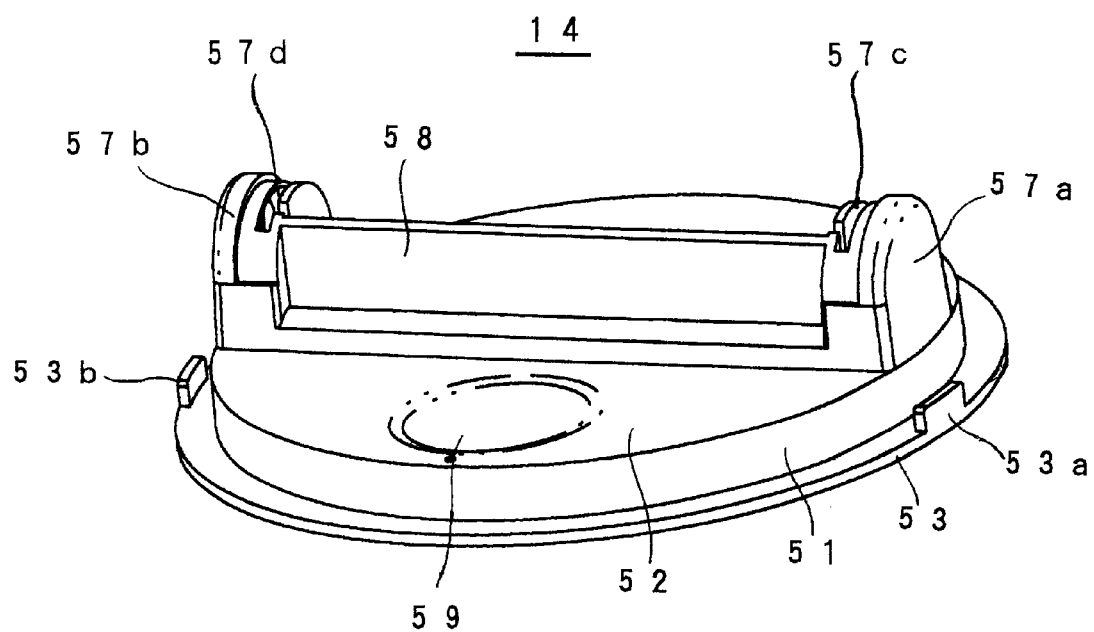
FIG. 8 is a perspective view of a middle cover viewed from the top.
Figure 9:
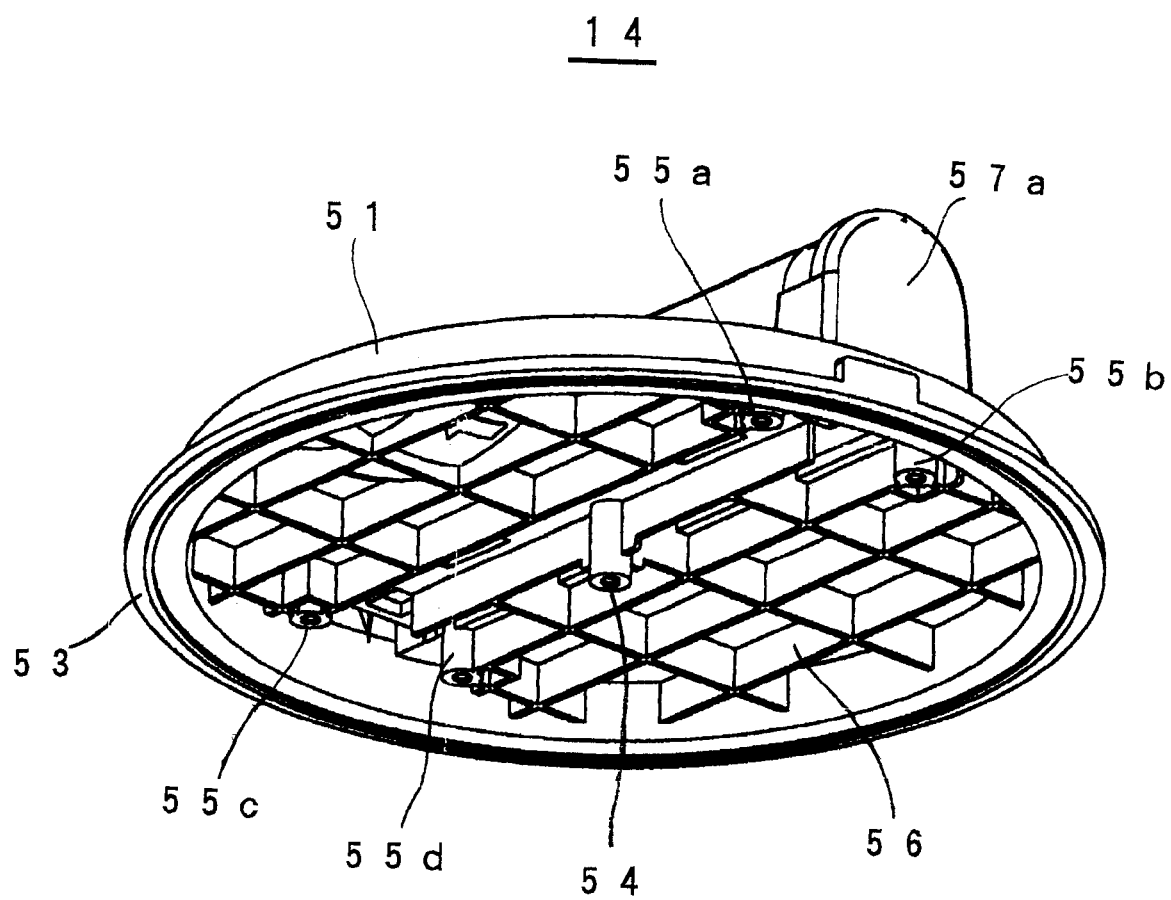
FIG. 9 is a perspective view of the middle cover viewed from the bottom.
Figure 10:
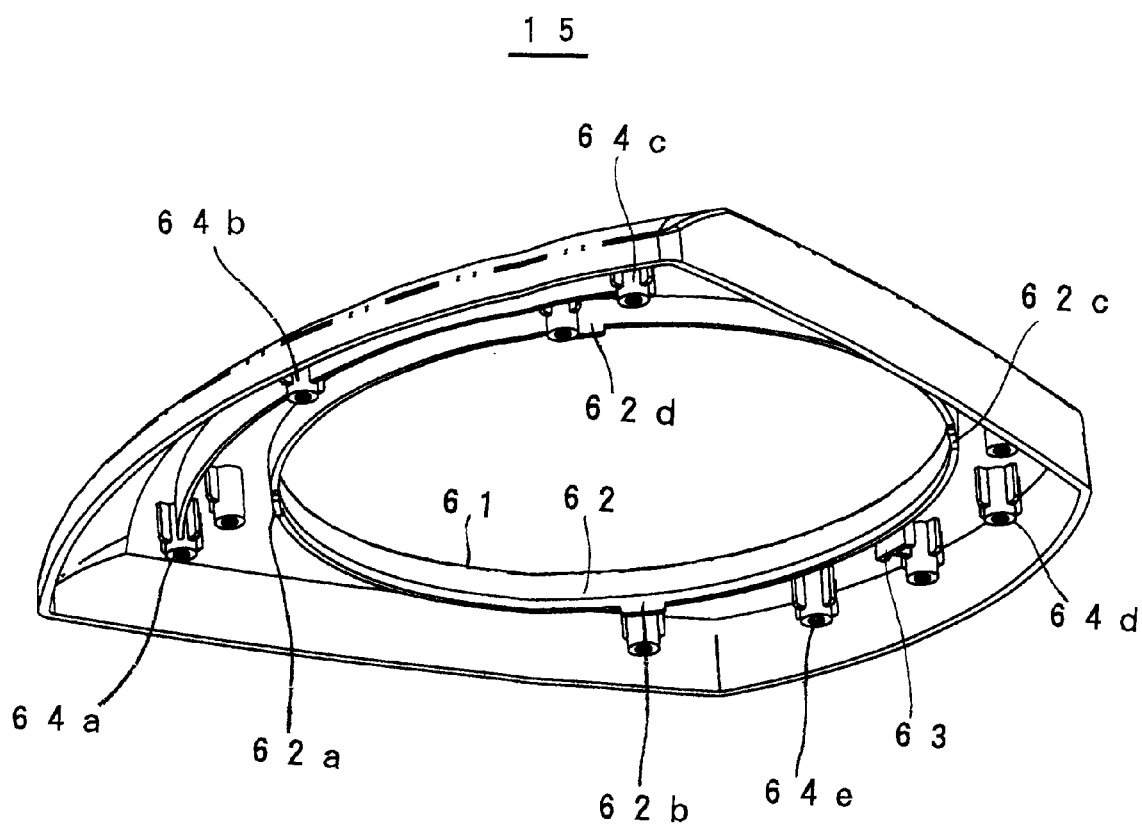
FIG. 10 is a perspective view of an upper cover viewed from the bottom.
Figure 11:
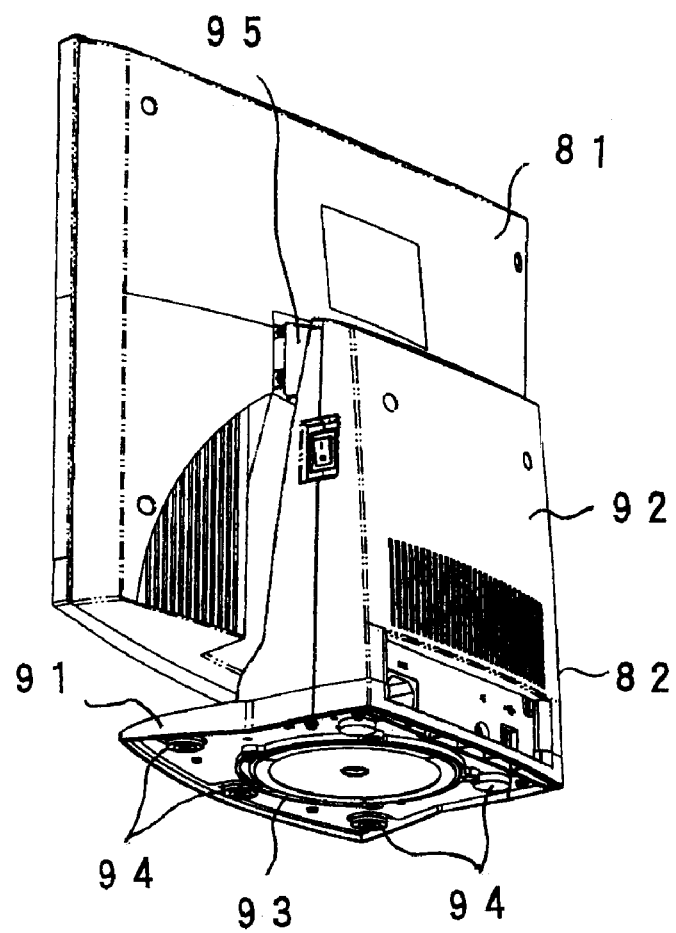
FIG. 11 is a perspective view of a display device using a conventional support device viewed from the backside.

FIG. 1 is a perspective view of a display device 1 using a support device 4, viewed from the front. FIG. 2 is a perspective view of the display device 1 viewed from the back. FIG. 3 is an enlarged perspective view of the support device 4. FIG. 4 is a cross section of the support device 4. FIG. 5 is an exploded view of the support device 4 viewed from the top. FIG. 6 is an exploded view of the support device 4 viewed from the bottom. FIG. 7 is a perspective view of a tilting unit 13. FIG. 8 is a perspective view of a middle cover 14 viewed from the top. FIG. 9 is a perspective view of the middle cover 14 viewed from the bottom. FIG. 10 is a perspective view of an upper cover 15 viewed from the bottom.

As shown in FIGS. 1 and 2, the display device 1 comprises a display body 3 and the support device 4.

As shown in FIGS. 3–6 appropriately, the support device 4 comprises a substrate 11, a sliding sheet 12, the tilting unit 13, the middle cover 14, the upper cover 15, feet 16a–16d, screws 17a–17e, and screws 18a–18d.

The substrate 11 is made of a metal such as a carbon steel, a stainless steel or an aluminum alloy and has substantially a trapezoidal plate-like shape viewed from the top. The middle portion of the substrate 11 is formed with a boss portion 21 which is convex upward, and a pivot support hole 22 is provided in the center of the boss portion 21. Five portions in the periphery of the substrate 11 are formed with boss portions 23a–23e which are convex upward, and holes 24a–24e are provided in the center of the boss portions 23a–23e, respectively.

The sliding sheet 12 is a circular sheet made of a synthetic resin having a good sliding property. The middle portion of the sliding sheet 12 is provided with a hole 31. The sliding sheet 12 is placed between the substrate 11 and the tilting unit 13 on which the middle cover 14 is placed so that the middle cover 14 can pivot smoothly on the substrate 11.

As shown in FIGS. 7 and 4 appropriately, the tilting unit 13 comprises two supporting members 41a and 41b, a pivoting arm 42, and two pivot shafts 43a and 43b.

Each of the supporting members 41a and 41b has an L-shaped cross section. On the bottom plate portion thereof, holes 44a–44d are provided for attachment. Screws 18a–18d are inserted in the holes 44a–44d and are screwed in the boss portions 55a–55d provided in the middle cover 14 to be fastened. Thus, the supporting members 41a and 41b are fixed to the middle cover 14.

The pivoting arm 42 includes two leg portions 42a and 42b, and a coupling portion 42c that couples the two leg portions 42a and 42b at the upper ends thereof, which are made of a metal integrally. The two leg portions 42a and 42b are attached to the supporting members 41a and 41b with the pivot shafts 43a and 43b, respectively, in a manner pivotable in the vertical plane.

Each of the pivot shafts 43a and 43b, which includes a shaft portion and a head portion having a larger diameter provided in one end of the shaft portion, is inserted in the holes of the supporting member 41a or 41b and the leg portion 42a or 42b. A friction member 47a or 47b is sandwiched between the supporting member 41a or 41b and the leg portion 42a or 42b. Then, the tip of the shaft portion is swaged. Thus, the supporting members 41a and 41b can pivot with respect to the leg portions 42a and 42b with some proper friction, so that the display body 3 can be retained in a tilting posture whose angle can be changed continuously.

Furthermore, the pivoting arm 42 can pivot within the range where nail protrusions 41c provided in the supporting members 41a and 41b are in notch portions 42d formed in the lower ends of the leg portions 42a and 42b.

The coupling portion 42c is provided with holes 45a–45d for mounting to the display body 3 and holes 46a and 46b for positioning. The display body 3 is positioned when bosses 71a and 71b (see FIG. 2) protruding from the backside fit in the holes 46a and 46b, and is fixed to the coupling portion 42c by the screws inserted in holes 45a–45d.

As shown in FIGS. 8, 9 and 4 appropriately, the middle cover 14 comprises a cylindrical portion 51, a top plate portion 52 provided on the upper end surface of the cylindrical portion 51, and a ring plate portion 53 extending from the rim of the lower end surface of the cylindrical portion 51 outward in the horizontal direction.

The top plate portion 52 includes a protruding shaft portion 54 projecting downward in the middle portion thereof, boss portions 55a–55d projecting downward at both ends, a reinforcing rib 56 formed in a grid shape inside the cylindrical portion 51, pivot cover portions 57a and 57b projecting upward at both ends, a vertical wall portion 58 provided therebetween, and a recess 59 provided in the front portion.

The protruding shaft portion 54 is inserted in the pivot support hole 22 of the substrate 11 in pivotable manner. Therefore, the middle cover 14 can pivot with respect to the protruding shaft portion 54. In addition, the ring plate portion 53 is sandwiched between the substrate 11 and the upper cover 15 in pivotable manner, so that a movement in the vertical direction is restricted.

Two portions on the rim of the ring plate portion 53 are provided with pivot stoppers 53a and 53b projecting upward, which abut a stopper 63 of the upper cover 15 from the right side or the left side, so that the pivot angle of the middle cover 14 is limited to approximately 90 degrees in the right and the left direction, respectively.

Furthermore, the recess 59 is provided for inserting a finger easily when operating an operation knob provided on the lower middle portion of the display body 3.

As shown in FIGS. 10 and 4 appropriately, the upper cover 15 has substantially a trapezoidal shape a little larger than the substrate 11 in a plan view. In the middle portion of the upper cover 15, there is a hole 61 in which the cylindrical portion 51 of the middle cover 14 fits, and the periphery of the hole 61 is formed as a cylindrical wall 62. Four portions of the cylindrical wall 62 are provided with protruding portions 62a–62d projecting downward. The protruding portions 62a–62d prevent the upper surface of the ring plate portion 53 from floating up.

The back of the cylindrical wall 62 is provided with the stopper 63 for restricting the pivot range of the middle cover 14. The inner surface of the upper cover 15 is provided with boss portions 64a–64e in which the screws 17a–17e are screwed.

The substrate 11 is fixed when the boss portions 23a–23e thereof abuts the lower end surface of the corresponding boss portions 64a–64e, and the screws 17a–17e inserted in the holes 24a–24e are screwed in the boss portions 64a–64e.

Disk-like feet 16a–16d are fixed to the lower surface of the substrate 11 by a double-faced tape or an adhesive.

The substrate 11 is provided in inward relation from the lower end rim of the upper cover 15. The feet 16a–16d protrude a little outer than the lower end rim of the upper cover 15 and abut the surface of the desk or the table.

Furthermore, each member of the substrate 11 and the tilting unit 13 can be formed by press working, for example. The middle cover 14 and the upper cover 15 are formed by integral molding of a synthetic resin. However, they can be made by other molding process and other material.

The support device 4 is assembled by the following steps.

First, the pivoting arm 42 of the tilting unit 13 is inserted into the middle cover 14 at slits 57c, 57d from the lower side, and the supporting members 41a and 41b are fixed to the middle cover 14 at the boss portions 55a–55d with the screws 18a–18d.

The sliding sheet 12 is placed on the substrate 11, and an assembly of the tilting unit 13 and the middle cover 14 is set in the substrate 11. Then, the upper cover 15 is set on them. The upper cover 15 is fixed to the substrate 11 with the screws 17a–17e. Then, the feet 16a–16d are attached. The feet 16a–16d can be attached to the substrate 11 beforehand.

In this way, the support device 4 can be assembled very easily. The size of the screws 17a–17e can be the same as that of the screws 18a–18d, so that the support device 4 can be assembled with only one type of screws.

The display body 3 is attached to the support device 4 as follows.

The bosses 71a and 71b of the display body 3 are fitted in the holes 46a and 46b of the tilting unit 13 and fixed with screws. These screws also can be the same type as the above-mentioned screws 17a–17e and 18a–18d.

According to the above-mentioned support device 4, when the display device 1 is placed on the surface of the desk or the table, the feet 16a–16d abut the surface of the desk or the table, so that the entire body of the display device 1 can be supported stably by the substrate 11. The area of the substrate 11 can be widened if necessary.

The middle cover 14 is placed on the sliding sheet 12 that is placed on the substrate 11, so as to pivot with respect to the protruding shaft portion 54. Therefore, the pivot movement is smooth and stable.

The display body 3 can be tilted by holding the display body 3 and by pivoting the same with respect to the pivot shafts 43a and 43b to a desired angle. Since the position of the pivot shafts 43a and 43b as a center of the pivot movement is low, the pivot movement is performed stably and has an advantage in a falling angle. The support device 4 does not fall during the pivot movement. It is possible to design with the minimum outer shape dimension for the falling angle.

In the above-mentioned embodiment, the structure, the shape, the dimension, the number and the material of a whole or a part of the substrate 11, the sliding sheet 12, the tilting unit 13, the middle cover 14, the upper cover 15 and the display device 1 can be changed within the scope of the present invention.

According to the above-mentioned embodiment, the display body can be supported stably, and the support device can be a compact size. While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A support device of a display for supporting a display body in a manner pivotable in the horizontal plane and in the vertical plane, the support device comprising:

a substrate;

an upper cover attached to the substrate;

a middle cover being partially sandwiched between the substrate and the upper cover so as to be pivotable in the horizontal plane; and a tilting unit being attached to the middle cover and having a pivoting arm being pivotable in the vertical plane and being attached to the display body;

wherein the middle cover includes a cylindrical portion, a top plate portion provided on the upper end surface of the cylindrical portion, a ring plate portion extending outward in the horizontal direction from a periphery of the lower end surface of the cylindrical portion and a protruding shaft portion projecting downward from the middle portion of the top plate portion, and the protruding shaft portion is inserted in a pivot support hole provided substantially in the middle portion of the substrate in pivotable manner, and the ring plate portion is sandwiched between the substrate and the upper cover in pivotable manner so that the vertical movement is restricted.

2. A support device of a display for supporting a display body in a manner pivotable in the horizontal plane and in the vertical plane, the support device comprising:

a substrate;

an upper cover attached to the substrate;

a middle cover being partially sandwiched between the substrate and the upper cover so as to be pivotable in the horizontal plane; and a tilting unit being attached to the middle cover and having a pivoting arm being pivotable in the vertical plane and being attached to the display body;

wherein the tilting unit includes two supporting members attached to a boss portion provided in the middle cover with screws that are inserted from the bottom, and the pivoting arm includes two leg portions that are pivotable with respect to the two supporting members and a coupling portion for coupling integrally the two leg portions at the upper end portions as a single piece, and the coupling portion is provided with a hole or a protrusion for mounting the display body.

* * * * *